United States Patent [19]

Cremieux

[11] 4,453,869
[45] Jun. 12, 1984

[54] FASTENER TECHNOLOGY

[76] Inventor: George V. Cremieux, 2701 E. Utopia Rd., Phoenix, Ariz. 85024

[21] Appl. No.: 251,904

[22] Filed: Apr. 7, 1981

[51] Int. Cl.³ .............................................. F16B 35/04
[52] U.S. Cl. ...................................... 411/38; 411/34; 411/344; 411/523
[58] Field of Search ................................... 411/34–38, 411/57, 58, 60, 61, 62, 520, 522, 523, 524, 547, 174, 175, 340–346, 15; 248/205 B, 231.1, 225.3 A, 475 R, 489, 497

[56] References Cited

U.S. PATENT DOCUMENTS

| Re. 21,769 | 4/1941 | Tinnerman | 411/524 |
|---|---|---|---|
| 979,452 | 12/1910 | Edgar, Sr. | 411/522 |
| 1,295,734 | 2/1919 | Greubel | 411/38 |
| 2,369,962 | 2/1945 | Gisondi | 411/523 |
| 2,610,013 | 9/1952 | Gibson | 411/38 |
| 4,197,781 | 4/1980 | Giannuzzi | 411/34 |

FOREIGN PATENT DOCUMENTS 2353055 10/1973 Fed. Rep. of Germany ... 248/205 B

*Primary Examiner*—Thomas J. Holko
*Assistant Examiner*—Neill Wilson
*Attorney, Agent, or Firm*—Anthony G. Eggink

[57] ABSTRACT

The one legged fastener is for securing an object to a wall. The one legged fastener has a body with one leg which has a prebent knee that permits the leg to be easily inserted through a desired hole in the wall. The fastener body is made of a bendable material and has a tab portion and a foot portion at the opposite ends of the leg. The tab has a hole in alignment with a threaded hole in the foot portion. By placing a screw through the tab portion hole and turning it through the threaded hole in the foot, the one legged fastener bends at the knee and is secured to the wall to secure an object.

10 Claims, 7 Drawing Figures

FASTENER TECHNOLOGY

This invention relates to a fastener for securing an object proximate to the exterior wall surface of an apertured wall. Particularly, this invention relates to an expansible fastener having a threaded screw and a unitary body structure constructed of a generally thin, longitudinally extending, rectalinearly shaped, bendable material.

Fasteners according to the invention are useful for securing objects to hollow walls, thin plywood, plasterboard and the like, and are especially useful for hanging objects from such surfaces.

Many types and styles of fasteners have been proposed for use with these types of surfaces and walls. However, these fasteners have been difficult to manufacture, burdensome to use, and unduly expensive. Most have been of the multi-legged style, constructed of multi-part bodies, and, thus, difficult and expensive to manufacture. Additionally, these styles of fasteners require much force to expand, making them difficult to utilize and requires more costly materials.

Despite the longstanding need for a simple and inexpensive to manufacture and utilize fastener for the above mentioned purposes, none insofar as is known has been developed. A practical, inexpensive, easy to manufacture and use fastener is provided by the teachings of this invention.

In summary, this invention provides an expansible fastener for securing an object proximate to the exterior surface of an apertured hollow wall. The fastener is comprised of a screw having a head and a threaded shaft, and a body member constructed of a generally thin, longitudinally extending, rectalinearly shaped, rigid but bendable material.

The body portion or member of the fastener includes a continuous, congruous number of functional portions, which include a tab portion, a neck portion, a leg portion bent at its knee, and a foot portion. The tab portion is for holding the fastener while it is secured to the apertured wall. The neck portion which extends from one end of the tab portion abuts the exterior surface of the wall at the peripheral portions of the wall aperture. The leg portion extends from one end of the neck portion and protrudes through the wall aperture. The leg portion has a bent knee intermediate its length. At the end of the leg portion extends a foot portion disposed in generally parallel spacial configuration to the tab and neck portions. The tab and neck portions are generally rectalinearly shaped having widths which exceed the diameter of the wall aperture, while the remainder of the body member portions have widths which are equal to or smaller than the diameter of the wall aperture. The tab portion has an aperture disposed at the end from which the neck portion extends. The neck portion also has an aperture which is axially aligned with the tab aperture. These apertures are for receiving the shaft of the screw, and have generally a diameter which is equal to or greater than that of the screw shaft, but smaller than that of the screw head. The foot portion additionally has screw thread receiving means axially aligned with the tab and neck apertures.

In use, the body member of the fastener is placed with the tab and neck portions abutting the exterior wall surface so that their respective apertures align with the wall aperture. The remaining portions of the body member extend through the wall aperture. While holding the tab portion, the user inserts the screw shaft through the tab and neck apertures and threads it into the screw thread receiving means of the foot portion. Additional rotation of the screw causes the screw head to abut the tab portion or an object if placed between the screw head and tab. Subsequent screw rotation brings the foot portion toward the neck and tab portions by bending the leg portion at the knee. This action secures the fastener and object to the exterior of the wall.

Additionally provided by the invention are fastener embodiments which utilize laterally disposed scored or weakened portions in the tab portion which allow the user to remove or break off a portion of the tab after installation, and which allow the tab portion to be bent into a hook configuration so that objects can be suspended therefrom.

Other embodiments provide the addition of a shoulder portion disposed between the neck and leg portion to extend the thickness of the wall, and the addition of a diametrically opposed leg portion from the end of the foot portion. Another embodiment eliminates the neck portion and provides the extension of the bent leg portion directly from the apertured end of the tab portion. The latter also has an aperture at its upper leg portion for receiving the extension of the screw shaft. These embodiments, are particularly useful for relatively thick or thin walls, and are designed especially for use with these walls. All embodiments, however, present body members or portions which are capable of manufacture from unitary, generally thin, longitudinally extending and rectalinearly shaped, bendable sheet stock materials.

These and other benefits of this invention will become clear from the following description by reference to the drawings, wherein.

Figure 2:
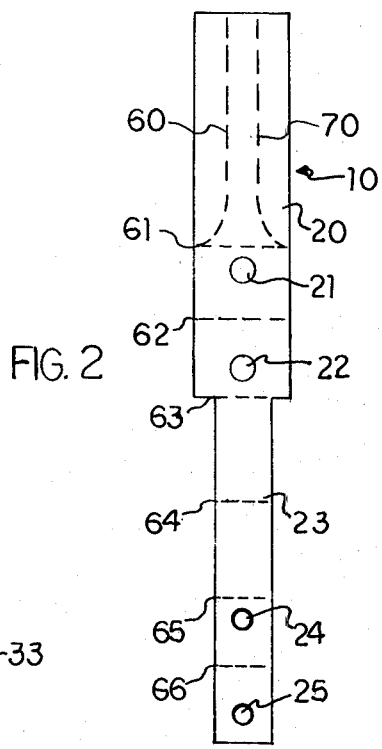
FIG. 2 is a schematic top view of the unitary, longitudinally extending, rectalinearly shaped, bendable material from which the body member of the fastener is constructed.

Referring to FIG. 2, a unitary, longitudinally extending, rectalinearly shaped structure 10 is illustrated having a tab and neck portion 20, a leg and foot portion 23, apertures or clearance holes 21 and 22, and internally threaded apertures or screw thread receiving means 24 and 25. Unitary structure 10 is made of a rigid but bendable material which when bent and formed results in the body portion or member of the fastener of the invention.

Figure 1:
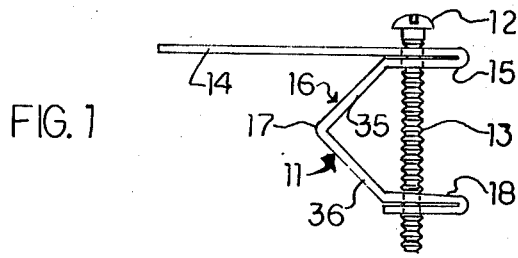
FIG. 1 is a schematic side plan view of a fastener of the invention.

FIG. 1 illustrates the fastener having a body portion or member 11 and a screw having a head portion 12 and a threaded shaft portion 13. The body member has a tab portion 14, a neck portion 15, a leg portion 16 which is bent at knee 17, and a foot portion 18. As shown, the body member 11 is a continuous, congruous body made up of various functional parts.

The functional parts described in conjunction with FIG. 1 are outlined in FIG. 2 by a number of dotted lines. For example, line 62 indicates the fold between the tab and neck portions, line 63 indicates the fold or bend between the neck and leg portions, line 64 indicates the knee of the leg, and line 65 indicates the bend between the leg and foot portions. Optionally, as will be discussed below, lines 60 and 70 indicate an alternative configuration for the handle end of tab portion 14, line 61 indicates a score line to fold the tab portion for utilization as a hook device, and line 66 indicates a fold to create a double foot arrangement for added screw thread securement to expand and hold the fastener.

Figure 3:
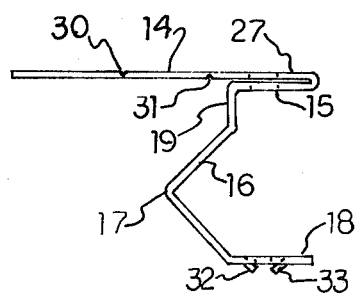
FIG. 3 is a schematic side plan view of an embodiment of a fastener of the invention.
Figure 4:
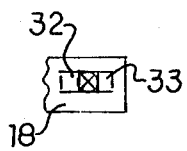
FIG. 4 is a schematic bottom view of the foot portion of the body member of a fastener of the invention.
Figure 6:
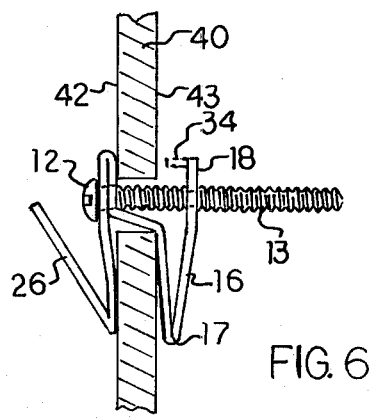
FIG. 6 is a schematic side plan view of the fastener illustrated in FIG. 5 in a secured and ready to utilize position; and, FIG. 7 is a schematic side plan view of another embodiment of a fastener extended through an apertured wall.

FIG. 3 shows another embodiment of the fastener. In addition to the functional portions described above, this embodiment has a scored or weakened line 30 to facilitate the bending of the tab portion 14 into a hook configuration, as shown in FIG. 6, after the fastener has been secured to an apertured wall. Scored or weakened line 31 allows the tab portion 14 to be separated, and, thus, shortened for cosmetic purposes after installation. Shoulder portion 19 which extends between neck portion 15 and leg portion 16 can be utilized to compensate for the wall thickness into which the fastener is placed. And, foot portion 18 is shown to have an alternative screw thread receiving means comprised of opposing rectangular portions 32 and 33. FIG. 4 shows a bottom view of rectangular portions 32 and 33. These portions are cut and pushed outward from foot portion material 18, whereby the opposing inner edges of the rectangular portions serve to receive the threads of screw shaft 13.

Figure 5:
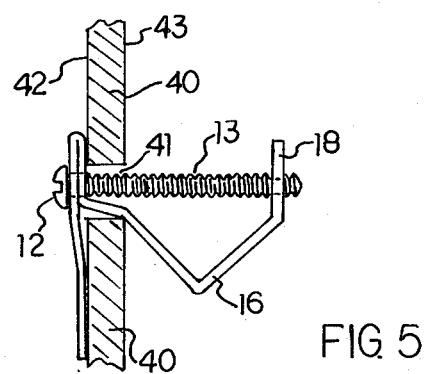
FIG. 5 is a schematic side plan view of another embodiment of a fastener extended through an apertured wall.

FIG. 5 illustrates the utilization of the fastener in an apertured hollow wall 40 having aperture 41, exterior surface 42 and interior surface 43. As shown, the tab and neck portions of the body member rest against the exterior surface 42 after the leg and foot portions have been placed through aperture 41. As is apparent, the widths of the tab and neck portions exceed that of the wall aperture 41, while the widths of the remaining body member portions are equal to or less than that of the wall aperture. After proper placement of the body member, the screw shaft 13 is extended through the tab and neck apertures and then threaded into the thread receiving means of foot portion 18. The apertures or clearance holes 21 and 22 in the tab and neck portions, respectively, have a diameter which exceed the diameter of screw shaft 13, while the internally threaded aperture in foot portion 18 is tapped to engage the threads of threaded screw shaft 13. The tab, neck and foot apertures are axially aligned in body portion or member 11 to easily facilitate this process.

After placement of the body member 11 into the apertured wall, and the placement of the screw into the body member, the fastener can then be secured about the apertured wall as shown in FIG. 6. While the user of the device holds the tab portion to prevent the body member from turning, the screw is rotated into the thread receiving means of the foot portion. After the screw head 12 abuts the tab surface or an object placed between it and the tab portion, continued screw rotation causes the foot portion 18 to be brought toward the inner wall surface 43 as the leg portion 16 is bent at the knee 17. Ultimately, the upper portion of the leg is brought in contact with the inner wall surface 43, and the fastener is then secured. Optionally, a second, vertically extending leg portion 34 would, likewise abut the inner wall surface. This leg portion 34 would generally have a length equal to two opposing leg thicknesses to further secure the fastener. Additionally, FIG. 6 shows the utilization of hook portion 26 from which an object can be suspended. This feature, allows the double function of the tab portion of the body member, although this portion could be removed as mentioned above.

The generally flat, thin, and longitudinally extending body material from which the body member is constructed lends itself to a variety of body member configurations. For example, for use with relatively thin walls such as plywood, paneling board and the like, the fastener as illustrated in FIG. 1 can be constructed without the requirement of neck portion 15. This configuration would have the leg portion 16, having upper leg portion 35 and lower leg portion 36, extending directly from the apertured tab portion 27 (FIG. 3). The configuration would have the leg portion extending in V-shaped fashion from tab portion 14, and the foot portion extending from the lower leg portion. In this configuration, the upper leg portion would be apertured in axial alignment with the apertures of the tab and foot portions.

Figure 7:
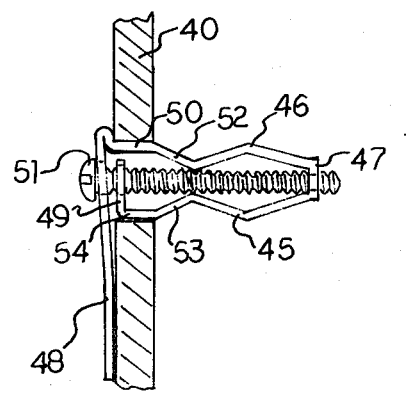

Another body member configuration is shown in FIG. 7. Unlike the configuration described in the above paragraph, this configuration would be best suited for relatively thicker walls, and for the securement of heavier objects. As shown, the body member is comprised of a tab portion 48, two opposing shoulder portions 50 and 54, two opposing arm portions 52 and 53, two opposing leg portions 45 and 46, a foot portion 47, and a threaded screw or bolt 51. Operationally, this embodiment functions similarly to those described above, although after expanding the leg portions by bending their respective knees as the screw is rotated into the foot portion 47, two opposing upper leg portions are pushed against the interior wall surface to secure the fastener device. Additionally, the neck portion 49 of this device does not serve the same function as those of the aforementioned embodiments.

The benefits of the above described fastener embodiments are many. All can be constructed of flat, thin and longitudinally extending metal stock, although some embodiments would also be adaptable to injection molded plastic processes. However, a primary benefit of particularly the one legged embodiments, are the pre-shaped bent knees which require relatively little force to cause the leg portions of the body members to expand. Additionally, the rectalinear, square cross sections of the upper leg portions or shoulder portions fit frictionally into the wall apertures and prevent body member rotation while the fastener is secured. These and other above described benefits result in an inexpensive, easy to manufacture, and simple to utilize expansible fastener device for use with hollow walls.

As many changes are possible to the embodiments of this invention utilizing the teachings of the invention, the descriptions above and the accompanying drawings should be interpreted in the illustrative and not in the limited sense.

That which is claimed is:

1. An expansible one legged fastener device having a separable screw and a unitary body structure for non deforming insertion into an apertured, interior and exterior surfaced wall structure to secure an object in proximity to the aperture, said body structure comprising:
  (a) a generally elongated initially flat tab portion for grasping by a user to insert said one legged device body, said tab portion further having an end portion and an apertured portion, (b) an apertured member extending generally 180 degrees congruously with said apertured portion of said tab portion, and having its aperture aligned with said aperture of said apertured portion, (c) an upper leg member congruously and obtusely appending from said apertured member, said upper leg member having a knee for bending at its end, (d) a lower leg member congruously and obtusely extending from said knee in the direction of said apertured member, said knee being in a preformed outwardly disposed configuration essentially having its most outward portion extending beyond the wall aperture in which the device is to be inserted, and, (e) a foot member having screw receiving means extending from said lower leg member, said screw receiving means spacially alligned with said apertures of said apertured portion and said apertured member, whereby, said one legged device body can be easily inserted through the wall aperture without deforming the device body structure, and as the screw is subsequently extended through both said apertures and threaded into said screw receiving means the head of the screw eventually abuts an object or said tab portion and causing said body portion to easily bend at the preformed knee and secure the device to the interior and exterior surfaces of the wall as the user holds said tab portion to prevent the device body portion from turning relative the wall aperture.

2. A one legged fastener for securing an object proximate to the exterior surface of an apertured hollow wall, said fastener comprising:

(a) a separable screw having a head and a threaded shaft, and, (b) a body portion being insertable through a wall aperture without deformation thereof, and being constructed of a generally thin, longitudinally extending, rectalinearly shaped, bendable material, said body portion having a tab portion, a neck portion, a leg portion and a foot portion, said tab and neck portion having a width greater than the aperture of the wall, and the remainder of the body having a width less than the aperture of the wall, said tab portion having an aperture at one end, said neck portion folded against said tab portion in generally parallel alignment thereto, said neck portion having an aperture in alignment with said aperture of said tab portion, said leg portion extending in generally C-shaped alignment from said neck portion, said leg portion having a pre-bent knee being outwardly disposed at generally its midsection, said pre-bent knee essentially being extended beyond the wall aperture in which the one legged device is to be used, said foot portion extending from the bottom of said leg portion in generally spaced parallel alignment with said neck and tab portions, said foot portion having screw thread receiving means in generally axial alignment with said tab and neck apertures, whereby, as said body portion is placed with said tab and neck portions against an exterior surface of an apertured wall with its tab and neck portion apertures in alignment with the wall aperture and the remainder of the body protruding through the wall aperture, said screw is extended through the tab and neck portion apertures and threaded into said thread receiving means until the screw head abuts the tab portion and, thereby, causes the leg portion to bend easily at the pre-bent knee and press against the interior of the hollow wall and, thus, securing the fastener.

3. The fastener of claim 2 wherein a shoulder portion extends between said neck portion and said leg portion of said body portion, said shoulder portion protruding generally vertical to said neck portion and having a length generally the thickness of the apertured wall.

4. The fastener of claim 2 wherein said thread receiving means comprises a tapped, internally threaded aperture.

5. The fastener of claim 2 wherein said thread receiving means comprises a pair of opposing rectalinear portions protruding downward from said foot portion, one edge of each said opposing rectalinear portions for receiving the threads of said screw.

6. The fastener of claim 2 wherein said tab portion has a score line for separating a part of said tab subsequent to the installation of said fastener.

7. The fastener of claim 2 wherein said tab portion has a score line for bending said tab portion intermediate one end and said aperture, said bend for use as a hook to hang an object subsequent to installation of said fastener.

8. A one legged fastener for securing an object proximate to the exterior surface of an apertured hollow wall, said fastener having a unitary, expansible body member being insertable for use into the wall aperture without deformation and a separable screw for use therewith having a head portion and a threaded shaft portion, said body member comprising a plurality of functional portions of a longitudinally extending, generally rectalinearly shaped, thin and bendable stock material, said functional portions including an elongated tab portion having a handle end and an apertured end, a generally V-shaped leg portion essentially being outwardly pre-bent at a generally intermediate knee and being appendedly disposed at one end from said apertured end of said tab portion, said V-shaped leg portion further having said knee pre-bent at an angle being 90 degrees or less, and being spacially extendable beyond the edge of the wall aperture, and a foot portion extending from the other end of said leg portion and being generally parallel and spacially aligned with said tab portion, said leg portion having an aperture in axial alignment with said aperture of said tab portion, and said foot portion having thread receiving means in axial alignment with said tab and leg apertures, said tab portion having a width at its apertured end greater than the size of the wall aperture, and said leg and foot portions having a width equal to or less than the size of the wall aperture, said tab aperture being larger than the screw shaft diameter and smaller than the screw head diameter, said leg aperture being larger than the screw shaft diameter, and said foot portion thread receiving means for receiving the threaded screw shaft, whereby, the user of the fastener subsequent to placing the body member without deformation thereof with said tab portion to the exterior wall surface and the remainder of said body extending through the wall apertures and rotates the shaft threads into the screw receiving means of the foot portion while holding the tab portion, and, thereby securing said fastener through and about the apertured wall as said leg portion bends at said pre-bent knee causing said body member of said fastener to expand and abut the hollow wall.

9. The fastener of claim 8 wherein said tab portion has a generally lateral score line at an intermediate line along its length, said score line for aiding the bending of said tab portion to form a hook for hanging an object therefrom.

10. The fastener of claim 3 wherein said body portion has extended from the end of said foot portion a second leg portion, said second leg portion extending generally vertical, said second leg portion being shorter than said bent leg portion, said second leg portion for abutting the interior wall surface as said foot portion is brought towards said neck and tab portions as the screw is rotated, thereby, stabilizing the fastener about the apertured wall.

* * * * *